United States Patent [19]

Wolff et al.

[11] Patent Number: 5,199,571
[45] Date of Patent: Apr. 6, 1993

[54] NESTABLE BUCKETS HAVING LOCKABLE BAILS

[75] Inventors: Stacy L. Wolff, Akron; Charles W. Craft, Jr., Apple Creek, both of Ohio

[73] Assignee: Rubbermaid Incorporated, Wooster, Ohio

[21] Appl. No.: 674,542

[22] Filed: Mar. 22, 1991

[51] Int. Cl.⁵ .............................................. B65D 25/00
[52] U.S. Cl. .................................... 206/518; 206/519; 220/763; 220/773
[58] Field of Search ................ 206/516, 518, 519, 506; 220/91, 92, 95, 96, 904

[56] References Cited

U.S. PATENT DOCUMENTS

| | | | |
|---|---|---|---|
| 587,417 | 8/1897 | Wittmann | 220/92 X |
| 1,156,690 | 10/1915 | Jones, Jr. | 206/516 |
| 1,180,354 | 4/1916 | White | 220/96 |
| 1,448,727 | 3/1923 | Clisby | 220/91 |
| 1,559,012 | 10/1925 | Smith | 16/126 |
| 2,519,666 | 8/1950 | Knox | 206/518 X |
| 2,851,187 | 9/1958 | Hall | 220/91 |
| 2,999,714 | 9/1961 | Ritchie | 294/31.2 |
| 3,341,047 | 9/1967 | Nauta | 220/96 X |
| 3,343,711 | 9/1967 | Godshalk | 206/519 X |
| 3,425,471 | 2/1969 | Yates, Jr. | 220/904 X |
| 3,756,451 | 9/1973 | Popeil | 220/96 |
| 4,181,226 | 1/1980 | Weinert | 206/519 |
| 4,351,448 | 9/1982 | Ingersoll et al. | 220/91 X |

OTHER PUBLICATIONS

Rubbermaid 88 brochure, p. 5, Rubbermaid Incorporated, Wooster, Ohio 44691, 1988 (2 pages).
Rubbermaid Food Service Products brochure, Rubbermaid Commercial Products Inc., 3124 Valley Avenue, Winchester, Va. 22601, 1989 (5 pages).

Primary Examiner—Steven M. Pollard
Attorney, Agent, or Firm—Renner, Kenner, Greive, Bobak, Taylor & Weber

[57] ABSTRACT

A bucket (10) has a bottom surface (11) and opposed side walls (12, 13) as well as adjoining opposed end walls (14, 15) extending upwardly from the bottom surface (11) forming an open top defined by a rim (21). A bail (24) has one end pivotally attached to the side walls (12, 13) and the other end carries a handle (28). Spouts (18, 19) are formed at the top of each end wall (14, 15). An assembly (33, 37) is provided to hold the bail (24) in a generally horizontal position adjacent to the rim (21). When the bail is not being so held and is pivoted such that its handle (28) is adjacent to an end wall (15), its pivot length is such that when the bucket (10) is stacked with like buckets (10A, 10B, 10C, 10D, 10E), the handles (28) of the lowermost three buckets (10, 10A, 10B) are underneath a spout (19) of the lowermost bucket (10) and the handles of the fourth and higher buckets (10C, 10D, 10E) rest in the spout of the third bucket therebelow.

41 Claims, 2 Drawing Sheets

NESTABLE BUCKETS HAVING LOCKABLE BAILS

TECHNICAL FIELD

The invention relates to a bucket such as used in the home to hold water or other liquids. More particularly, this invention relates to a bucket having a pivotable bail which can be locked or stowed in a generally horizontal position. More specifically, this invention relates to such a bucket which can also be conveniently nested within a like bucket for shipment or display purposes.

BACKGROUND ART

Most household buckets or pails are provided with bail-like handles by which the buckets may be carried. Such bails are usually pivotally connected to the sides of the bucket such that when the bucket is being transported, the generally vertically oriented bail is held by the user and the weight of the bucket is thereby supported. When the bucket is resting on the floor and the bail released, it will usually fall by gravity to one side or the other of the bucket. Depending on the configuration of the bucket, the bail is usually out of the way in this position, but it is serving no useful purpose.

It is also desirable for products such as buckets to be able to vertically nest with a plurality of like buckets for economic shipment and for retail display purposes. However, it is normally quite difficult to nest buckets having bails. Obviously, if the bails are in their upright positions the buckets cannot be nested. But even when the bails are at rest along a side of the bucket, it is difficult, if not impossible, to stack a plurality of buckets without at least partially rotating the bails toward their upright position at which time they will protrude from the side of the stack of buckets which not only wastes shipping space, but also renders the bails susceptible to being damaged.

DISCLOSURE OF THE INVENTION

It is thus a primary object of the present invention to provide a bucket with a pivotal bail which is positionable in three operable positions.

It is another object of the present invention to provide a bucket, as above, which in one of the bail positions the bail is locked generally horizontally along the rim of the bucket and extends outwardly of one end of the bucket so that, for example, the bucket may be hung on a wall when not in use.

It is a further object of the present invention to provide a bucket, as above, in which the bail, when locked in the horizontal position, can serve the additional function of holding a cleaning accessory such as a towel or the like.

It is an additional object of the present invention to provide a bucket, as above, in which the bail can be easily removed from its locked position and used to carry the bucket in a conventional fashion.

It is yet another object of the present invention to provide a bucket, as above, which when the bail is positioned at the other end of the bucket, the bucket may be stacked within a plurality of like buckets without the bails taking up additional space and without exposing the bails to potential damage.

These and other objects of the present invention, as well as the advantages over existing art forms, which will become apparent from the description to follow, are accomplished by the means hereinafter described and claimed.

In general, a bucket according to the concept of the present invention includes a bottom surface with opposed side walls and opposed end walls extending upwardly therefrom to form an open top defined by a rim. A bail has one end pivotally attached to the opposed side walls so that when in a generally vertical position, the bucket may be carried by a handle positioned on the other end of the bail. Means are also provided to hold the bail in a generally horizontal position along the rim when the bucket is in use or when it is being stored. A spout is provided at the top of at least one of the end walls. In order to nest the bucket within like buckets, the bail is pivoted so that its handle is adjacent to an end wall under the spout. The bail is of a pivot length such that when a plurality of containers are stacked, the handles of the lowest three buckets rest against one end wall of the lowermost bucket underneath the spout thereof, and the handle of the fourth and all higher buckets rest in the spouts of the third buckets therebelow.

A preferred exemplary bucket incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
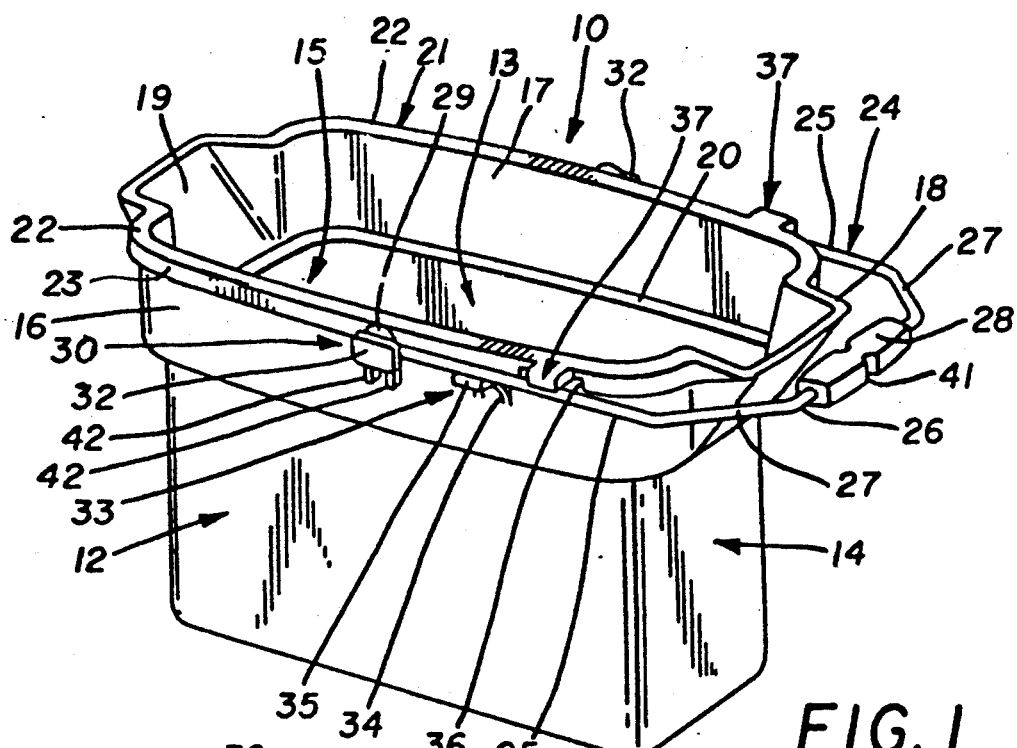
FIG. 1 is a perspective view of a bucket according to the concepts of the present invention showing the bail thereof in the locked or stowed position.

A bucket according to the concepts of the present invention is generally indicated by the numeral 10 and includes a bottom surface 11, opposed side walls generally indicated by the numerals 12 and 13, and adjoining opposed end walls generally indicated by the numerals 14 and 15. It is preferred that bucket 10 be molded of a suitable durable plastic material but it could be formed of any material, such as a metallic material, without departing from the spirit of this invention.

Side walls 12 and 13 and end walls 14 and 15 extend generally vertically upwardly from bottom surface 11 and as will hereinafter become evident, for stacking or nesting purposes, as well as molding purposes, it is preferred that they taper slightly outwardly from bottom to top, for example at a draft angle of approximately 3°. Side walls 12 and 13 include upper skirts 16 and 17, respectively, which extend somewhat outwardly from the generally vertical portions of side walls 12 and 13.

Skirts 16 and 17 also extend around the upper corner of bucket 10 thereby forming the upper and laterally outer portion of end walls 14 and 15. At least one, and preferably two pouring spouts 18 and 19 are formed at the top of end walls 14 and 15, respectively, between the ends of skirts 16 and 17 so that liquid contained in bucket 10 may be conveniently discharged therefrom at either end. Because skirts 16 and 17 and pouring spouts 18 and 19 extend outwardly away from side walls 12 and 13, and end walls 14 and 15, respectively, a peripheral ledge 20 is formed internally of bucket 10.

Figures 4, 5:
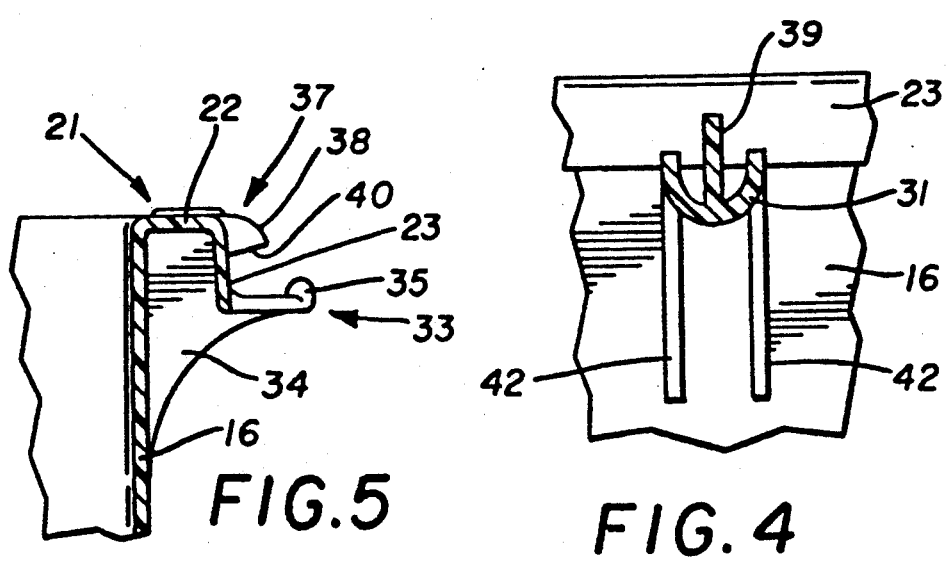
FIG. 4 is an enlarged sectional view taken substantially along line 4—4 of FIG. 3.
FIG. 5 is an enlarged sectional view taken substantially along line 5—5 of FIG. 2.

Side walls 12 and 13 and end walls 14 and 15 include an upper rim generally indicated by the numeral 21 formed at the top of skirts 16 and 17. Like skirts 16 and 17, rim 21 terminates at pouring spouts 18 and 19, and with pouring spouts 18 and 19 defines the open top periphery of bucket 10. As best shown in FIG. 5, rim 21 includes a generally horizontal ledge surface 22 which extends outwardly from walls 12, 13, 14 and 15 and terminates as a downwardly extending, generally vertically oriented, lip 23.

Bucket 10 is provided with a rather conventional generally U-shaped bail member generally indicated by the numeral 24. Bail member 24 is preferably made of a metallic material, but could be formed of a hard plastic material, and includes generally parallel opposed side rods 25, a handle receiving portion 26 oriented generally laterally of side rods 25, and angular portions 27 extending between side rods 25 and handle receiving portion 26. Portion 26 can carry a plastic handle 28 which can either be fixed thereto or rotatable thereon so that the user can readily carry bucket 10 by grasping handle 28 and allowing the weight of bucket 10 to be suspended on bail member 24 in view of the rotatable attachment of bail member 24 to bucket 10 now to be described.

The ends of side rods 25 opposite to angular portions 27 are formed as retaining loops or hooks 29 which are arcuate in nature and formed as slightly less than the 360° of a circle. Loops 29 are attached to bucket 10 as by bail holding and restraining assemblies generally indicated by the numeral 30. An assembly 30 extends outwardly from each skirt 16 and 17 of side walls 12 and 13, respectively, and includes a semicircular lug 31 as best shown in FIG. 4. A retaining plate 32 is positioned at the outer extent of each lug 31 and is generally parallel to lip 23 of rim 21. As such, when bail loops 29 are threaded around lugs 31, they are restrained between plate 32 and lip 23. Bail member 24 may thus be pivoted from the position shown in FIG. 2, for example, to an upright position for carrying bucket 10, as loops 29 thereof rotate on lugs 31.

Bail member 24 may also be pivoted to a locked position so that it is generally horizontally maintained along rim 21 as shown in FIG. 1 in a manner now to be described. A lower supporting tab, generally indicated by the numeral 33, extends outwardly from adjacent the lower portion of lip 23 of rim 21 of each side wall 12 and 13. Each tab 33 is supported by reinforcing webbing 34 and is positioned between bail holding assembly 30 and pouring spout 18. Each tab 33 can be provided with an upstanding barb 35 (FIG. 5) at the outer upper edge thereof.

Lip 23 is notched, as at 36, at a location between each tab 33 and spout 18, and an upper confining tab, generally indicated by the numeral 37, extends outwardly from rim 21 within notch 36. As shown in FIG. 5, upper confining tab 37 is laterally spaced from lower supporting tab 33 along rim 21, and is positioned above lower tab 33. Preferably upper tab 37 extends outward from side walls 12 and 13 to a point such that the space between it and the inner position of barb 35 is less than the size of rod 25 of bail 24 so as to provide an interference fit for side rods 25. As such, as bail 24 is rotated from a vertical position toward the FIG. 1 position, side rods 25 may ride over an arcuate upper portion 38 of tab 37 and be snapped between tab 37 and barb 35 such that it will rest on tab 33 directly under tab 37. In this position, bail 24 is thus held generally horizontally along rim 21. The height and the horizontal nature of the position of bail 24 is assured by vertical ribs 39 (FIG. 5) which extend upwardly from each lug 31 to engage bail loops 29 and assure that the loop 29 end of bail rods 25 are at the proper height. When it is desired to remove bail 24 from this stowed position, merely pulling upwardly on handle 28 will cause bail 24 to begin to rotate and bail rods 25 will slide along a bevelled undersurface 40 of each upper tab 37 which will then flex to release bail 24.

The length of bail 24 is specifically designed so that when in the stowed, FIG. 1 position, handle 28 will be spaced outwardly of spout 18; that is, the bail pivot distance between lug 31 of assembly 30 and handle 28 is greater than the distance between lug 31 and spout 18 thus leaving a space between handle 28 and spout 18. Such a space provides several advantages. For example, when in the FIG. 1 position and with the bucket in use, a towel or other cleaning accessory can be conveniently draped over handle 28 and be readily accessible to the user. Or, even more importantly, with the bail 24 in the locked, FIG. 1 position, and with the bucket not in use, the bucket may be conveniently hung on handle 28 on a wall with rim 21 facing the wall. To this end, handle 28 may be notched, as at 41, to receive a peg, nail or the like located on the wall. Handle 28 is shown as having two opposed notches 41 and thus, if handle 28 is rotatably mounted on bail handle receiving portion 26, either of the two notches 41 can be used for hanging bucket 10 on a wall. Thus, the FIG. 1 latched position is advantageous not only when the bucket is actually being used, but also when it is being stored.

Figure 2:
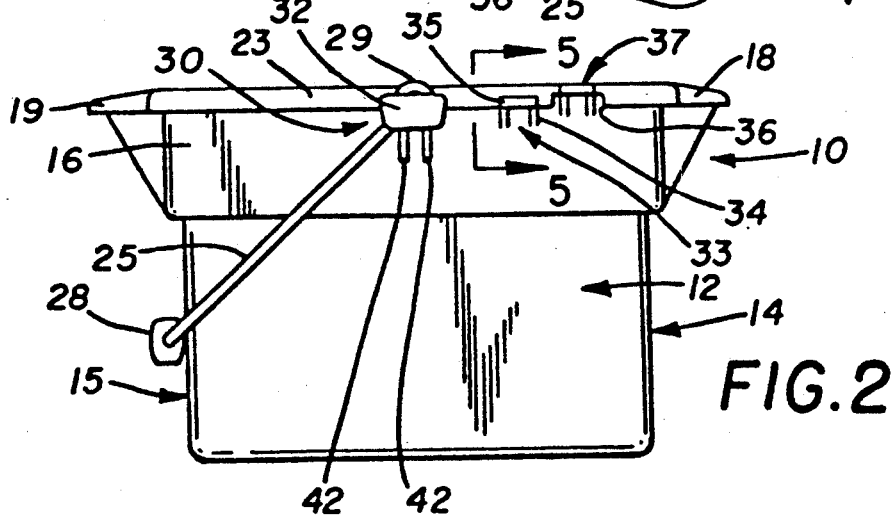
FIG. 2 is a side elevational view of the bucket of FIG. 1 showing the bail positioned at the opposite end of the bucket from that shown in FIG. 1.
Figure 3:
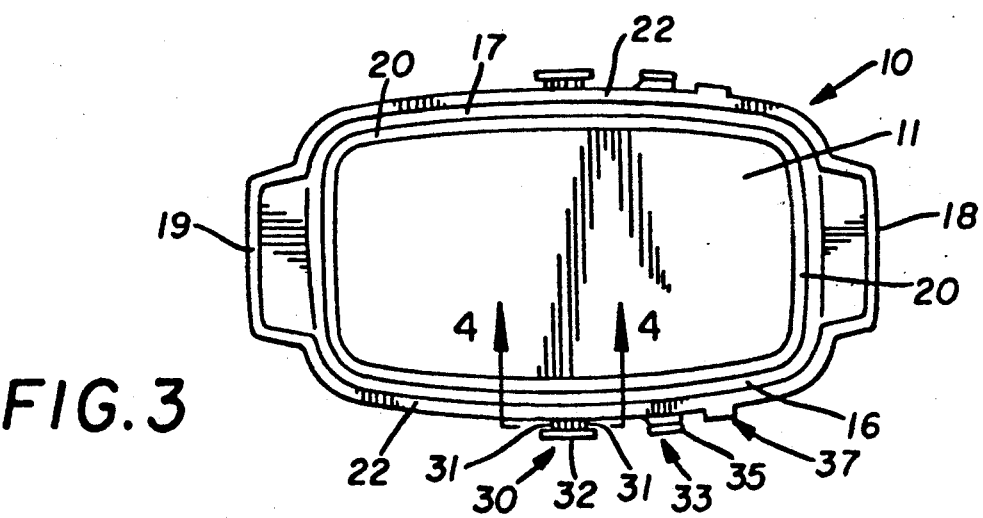
FIG. 3 is a top plan view of the bucket of FIG. 1 but having the bail removed for clarity.
Figure 6:
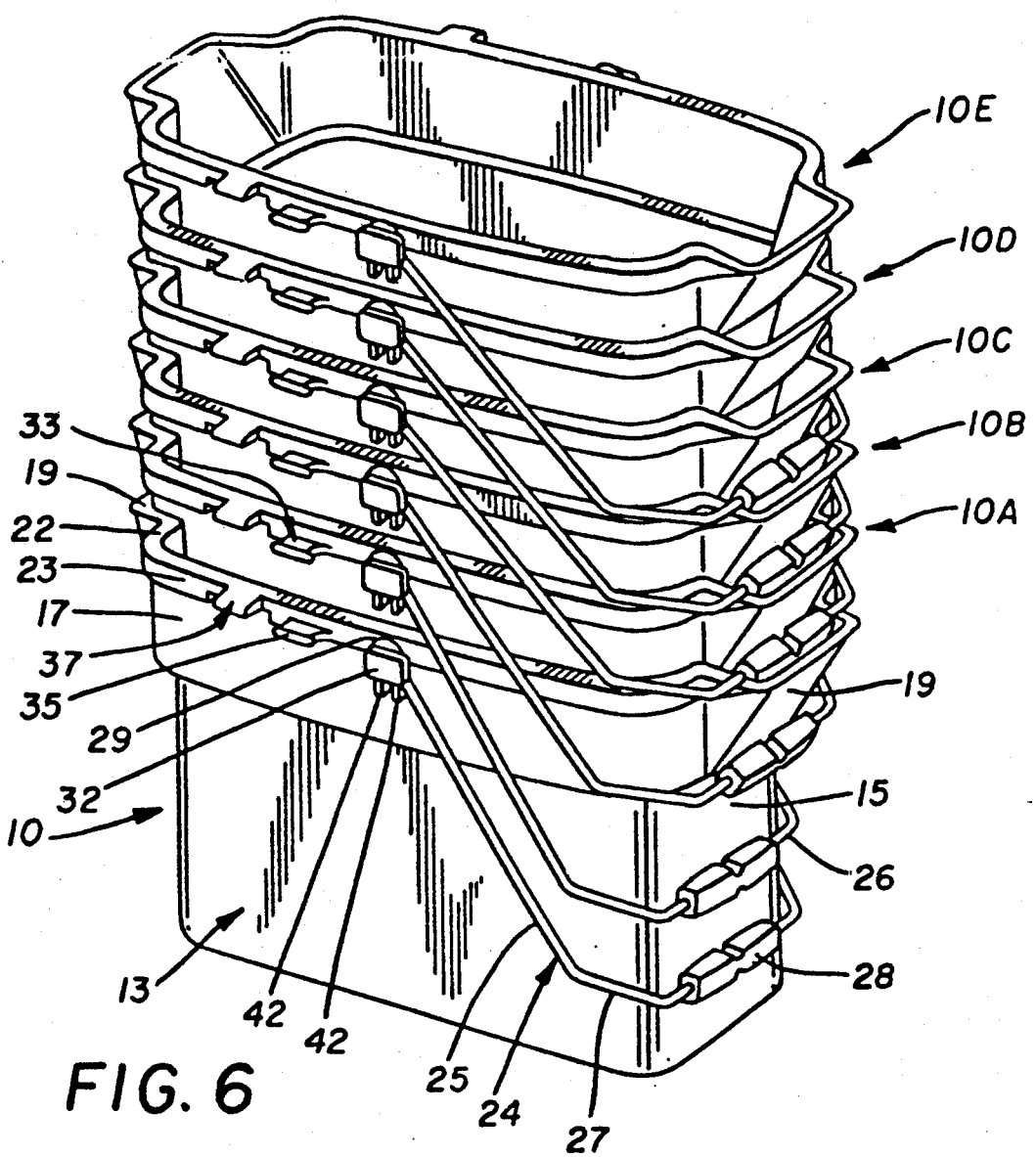
FIG. 6 is a perspective view showing the manner in which like buckets according to the concepts of the present invention may be nested within each other to form a vertical stack of buckets.

As shown in FIG. 2, when bail 24 is rotated the other direction, that is, toward end wall 14 and away from lower tab 33 and upper tab 37, it can swing all the way past rim 21 such that handle 28 is resting against end wall 15. In this general position, bucket 10 may be stacked with or nested within like buckets as shown in FIG. 6. When so nested, it is important that the stack of buckets 10 be vertical, which is assured by the draft angle of walls 12, 13, 14, 15. To assure that the buckets do not become wedged within each other, stacking ribs 42 (as best seen in FIG. 4) may extend downwardly from rim 21 along skirts 16 and 17 so that the bottom of ribs 42 will engage the ledge 22 of the bucket below.

It is also important that bail 24 does not only not interfere with the proper stacking or nesting but also that it will not be exposed to potential damage when buckets are stacked. FIG. 6 shows bucket 10 with five like buckets 10A, 10B, 10C, 10D and 10E stacked thereon or nested therein, and shows the manner in which the bails are protected and do not interfere with proper stacking. For clarity, the numbers of the other identical components shown for buckets 10A, 10B, 10C, 10D and 10E have not been indicated. As will be observed from FIG. 6, handle 28 of bucket 10 is resting against end wall 15, as is the handle of bucket 10A. The handle of bucket 10B is resting at the top of end wall 15 just below spout 19. As such, the handles of the lower three buckets are all safely confined below spout 19. The pivot length of bail 24, that is, the distance between lug 31 and handle 28, is specifically designed based on the spout to spout dimensions of the bucket so that starting with the fourth bucket up in the stack, in this instance bucket 10C, its handle will rest within the opening of spout 19, as will be the case with every bucket stacked in a stack of four or more. That is, the handle of bucket 10D will rest within the spout of bucket 10A, the handle of bucket 10E will rest within the spout of bucket 10B, etc. No matter how high the stack, after the third bucket, the spout of a bucket will receive the handle from the third bucket above it. As such, these handles are likewise not only protected, but also they do not protrude to detract from a vertical stacking arrangement. When thus vertically stacked, the buckets can be readily placed in a box or carton for economic shipment or they can be displayed at a retail establishment taking up a minimum amount of space.

While the specific length of bail 24 alone is not important, the relative pivot length of the bail and the spout to spout dimension of the bucket are important to creating the vertical stacking arrangement just described. For example, for a bucket having an external spout to spout dimension of approximately 17.4 inches, the pivot length of the bail, that is, the length from lugs 31 (centrally located on side walls 12 and 13) to the center of handle 28 would be approximately 9.6 inches. Obviously, increasing or decreasing the spout to spout dimension would proportionally increase or decrease the pivot length of the bail to achieve the same results.

It should thus be appreciated that bail 24 of the bucket 10 may be positioned at three potentially useful locations. First, it may be swung to an upright or vertical position for transporting the bucket; second, it may be located in the totally down position of FIG. 2 where, if desired, it is out of the way when the bucket is being used and where it can be located to be stacked with like buckets; and third when in the latched, FIG. 1, position, handle 28 can be utilized to carry cleaning accessories if the bucket is in use, and if not in use, the bucket can be hung by the handle on a wall in this latched position. Thus, the bucket constructed according to the concepts of the present invention, as described herein, accomplishes the objects of the present invention and otherwise substantially improves the art.

We claim:

1. A bucket comprising a bottom surface, wall members extending upwardly from said bottom surface forming an open top defined by a rim at the top of said wall members, a bail pivotally attached to opposed of said wall members, support tabs extending outwardly from said opposed of said wall members adjacent to said rim, and confining tabs extending outwardly from said opposed of said wall members adjacent to said rim, said confining tabs being positioned above said support tabs and flexing to permit said bail to pass thereby when pivoted so that said bail is locked between said support tabs below said bail and said confining tabs above said bail to hold said bail generally horizontally along said rim.

2. A bucket according to claim 1 wherein said confining tabs are laterally spaced from said support tabs along said opposed of said wall members.

3. A bucket according to claim 1 wherein said support tabs extend further outwardly from said opposed of said wall members than do said confining tabs.

4. A bucket according to claim 1 wherein said support tabs further includes a barb member extending upwardly from the outer end thereof.

5. A bucket according to claim 1 wherein the upper surface of said confining tabs is arcuate to assist the passage of said bail thereover as said bail is being pivoted toward said support tabs.

6. A bucket according to claim 5 wherein the lower surface of said confining tabs is bevelled to assist the passage of said bail thereagainst as said bail is being pivoted away from said support tabs.

7. A bucket according to claim 1 wherein said opposed of said wall members are side walls and said wall members also include opposed end walls, said bail being of such a length that it extends outwardly of a said end wall when being held in the generally horizontal position along said rim.

8. A bucket according to claim 7 further comprising spout members adjacent to said rim on said end walls.

9. A bucket according to claim 7 further comprising a handle member at the outer end of said bail.

10. A bucket according to claim 9 wherein said handle member is notched.

11. A bucket according to claim 1 further comprising assembly means on said opposed of said wall members on which said bail is pivoted.

12. A bucket according to claim 11 wherein said assembly means includes lug members around which said bail is pivoted.

13. A bucket according to claim 12 wherein said assembly means includes retainer members spaced from said opposed of said wall members and maintaining said bail on said lug members.

14. A bucket according to claim 12 wherein said means to hold said bail includes a rib member extending upwardly from said lug member.

15. A bucket according to claim 1 wherein said wall members taper outwardly from said bottom surface so that a like bucket may be nested within the bucket.

16. A bucket according to claim 15 further comprising a stacking rib on at least one of said wall members, said stacking rib of the like bucket engaging said rim when the like bucket is nested within the bucket.

17. A bucket according to claim 15 wherein said opposed of said wall members are side walls and said wall members also include opposed end walls, and further comprising handle means on the end of said bail, said bail being pivoted so that said handle means is positioned adjacent to one said end wall when a like bucket is nested within the bucket.

18. A bucket according to claim 17 further comprising spout members adjacent to said rim on said end walls, both said handle and the handle of the like bucket being positioned beneath one said spout member when the like bucket is nested within the bucket.

19. A bucket comprising a bottom surface, wall members extending upwardly from said bottom surface forming an open top defined by a rim at the top of said wall members, said wall members tapering outwardly from said bottom surface so that a like bucket may be nested within the bucket, said wall members including opposed side walls and opposed end walls, a bail pivotally attached to said opposed side walls, means adjacent to said rim to hold said bail generally horizontally along said rim, handle means on the end of said bail, said bail being pivoted so that said handle means is positioned adjacent to one said end wall when a like bucket is nested within the bucket, and spout members adjacent to said rim on said end walls, both said handle and the handle of the like bucket being positioned beneath one said spout member when the like bucket is nested within the bucket, and when three like buckets are nested within the bucket and within each other, the handle of the uppermost like bucket being positioned in said spout of the bucket.

20. A bucket capable of being nested with a plurality of like buckets to form a stack of buckets comprising a bottom surface, opposed side walls and adjoining opposed end walls extending upwardly from said bottom surface forming an open top, a bail having one end pivotally attached to said opposed side walls, a handle carried by the other end of said bail, a spout member formed at the top of at least one of said end walls, said bail having a pivot length such that said handles of the lowest three of the plurality of buckets in a stack rest against the one said end wall of the lowermost bucket and underneath the spout of the lowermost bucket, and the handle of the fourth of the plurality of buckets rests in said spout of the lowermost bucket.

21. A bucket according to claim 20 wherein the handles of all like stacked buckets above the fourth bucket rest in the spout of the third bucket therebelow.

22. A bucket according to claim 20 wherein said side walls and said end walls taper outwardly from said bottom surface so that when the plurality of like buckets are stacked, the side walls and end walls of one bucket are received within the side walls and end walls of another bucket.

23. A bucket according to claim 22 further comprising means to limit the extent to which one bucket is received within the bucket therebelow.

24. A bucket according to claim 23 wherein said means to limit includes at least one stacking rib positioned near the top of at least one of said side walls, said stacking rib being adapted to engage the top of the side wall of the adjacent bucket below in the stack of buckets.

25. A bucket according to claim 20 further comprising a rim at the top of said side walls, said rim extending around to the top of said end walls and terminating at said spout member.

26. A bucket according to claim 20 further comprising means on at least one said side wall to hold said bail generally horizontally adjacent to said open top.

27. A bucket according to claim 26 wherein said pivot length of said bail is such that said handle is spaced from the outer edge of a said end wall when said bail is held in the generally horizontal position.

28. A bucket according to claim 26 wherein said means to hold said bail includes a support tab extending outwardly from said one said side wall near the top thereof, said bail resting on said support tab when in the generally horizontal position.

29. A bucket according to claim 28 wherein said means to hold said bail includes a confining tab extending outwardly from said one said side wall near the top thereof, said confining tab being positioned above said support tab and flexing to permit said bail to pass thereby when pivoted.

30. A bucket according to claim 29 wherein said confining tab is laterally spaced from said support tab along said one said side wall.

31. A bucket according to claim 29 wherein said support tab extends further outwardly from said one said side wall than does said confining tab.

32. A bucket according to claim 29 wherein said support tab further includes a barb member extending upwardly from the outer end thereof.

33. A bucket according to claim 29 wherein the upper surface of said confining tab is arcuate to assist the passage of said bail thereover as said bail is being pivoted toward said support tab.

34. A bucket according to claim 33 wherein the lower surface of said confining tab is bevelled to assist the passage of said bail thereagainst as said bail is being pivoted away from said support tab.

35. A bucket according to claim 20 further comprising assembly means on said side walls on which said bail is pivoted.

36. A bucket according to claim 35 wherein said assembly means includes lug members around which said bail is pivoted.

37. A bucket according to claim 36 wherein said assembly means includes retainer members spaced from said side walls and maintaining said bail on said lug members.

38. A bucket according to claim 37 further comprising means on at least one said side wall to said bail generally horizontally adjacent to said top.

39. A bucket according to claim 38 wherein said means to hold said bail includes a rib member extending upwardly from said lug member.

40. A bucket according to claim 39 wherein said means to hold said bail includes a support tab extending outwardly from said one said side wall near the top thereof, said bail resting on said support tab when in the generally horizontal position.

41. A bucket according to claim 40 wherein said means to hold said bail includes a confining tab extending outwardly from said one said side wall near the top thereof, said confining tab being positioned above said support tab and flexing to permit said bail to pass thereby when pivoted.

* * * * *